United States Patent
Zhao et al.

(10) Patent No.: US 7,084,654 B2
(45) Date of Patent: Aug. 1, 2006

(54) "2-STEP CONTACT" CLAMPING FIXTURE FOR THE FLEXIBLE PRINT CIRCUIT ON A HEAD GIMBAL ASSEMBLY

(75) Inventors: Yangguo Zhao, Dongguan (CN); Siukei Wong, Tsing Yi (HK)

(73) Assignee: SAE Magnetics (H.K.) Ltd., Shatin (HK)

( * ) Notice: Subject to any disclaimer, the term of this patent is extended or adjusted under 35 U.S.C. 154(b) by 0 days.

(21) Appl. No.: 11/051,039

(22) Filed: Feb. 3, 2005

(65) Prior Publication Data
US 2006/0006895 A1    Jan. 12, 2006

(30) Foreign Application Priority Data
Jul. 9, 2004    (WO) ..................... PCT/CN04/00773

(51) Int. Cl.
*G01R 31/02* (2006.01)
(52) U.S. Cl. ....................... 324/754; 324/757
(58) Field of Classification Search ..................... None
See application file for complete search history.

(56) References Cited

U.S. PATENT DOCUMENTS 5,795,172 A * 8/1998 Shahriari et al. ........... 439/260
6,208,155 B1 * 3/2001 Barabi et al. ............... 324/754
6,483,716 B1 * 11/2002 Shin .......................... 361/800

OTHER PUBLICATIONS

PUCAST OY ESD-Materials Oct. 29, 2001.*

* cited by examiner

*Primary Examiner*—Paresh Patel
*Assistant Examiner*—Roberto Velez
(74) *Attorney, Agent, or Firm*—Kenyon & Kenyon LLP (57) ABSTRACT

A system and method are disclosed for clamping test probes to the test pads of a flexible printed circuit of a head gimbal assembly. A two-step contact method is used to prevent electro-static damage. The clamp is made of a dissipative material, as is the test probe housing. A spring-loaded slider block in the test probe housing allows the clamp to make contact with the test pads before the test pads are brought into contact with the test probes. The dissipative material of the clamp and the housing allows the electrical potential of the test pads and the electrical potential of the test probes to be equalized before the two are brought into contact with each other.

20 Claims, 8 Drawing Sheets

*Figure 8a* ns
"2-STEP CONTACT" CLAMPING FIXTURE FOR THE FLEXIBLE PRINT CIRCUIT ON A HEAD GIMBAL ASSEMBLY

BACKGROUND INFORMATION

The present invention is directed to the electrical connections of the slider of a head gimbal assembly. More specifically, the present invention pertains to clamping the test probes of a preamplifier board to the contact pads of the flexible printed circuit assembly of the head gimbal assembly.

Figure 1:
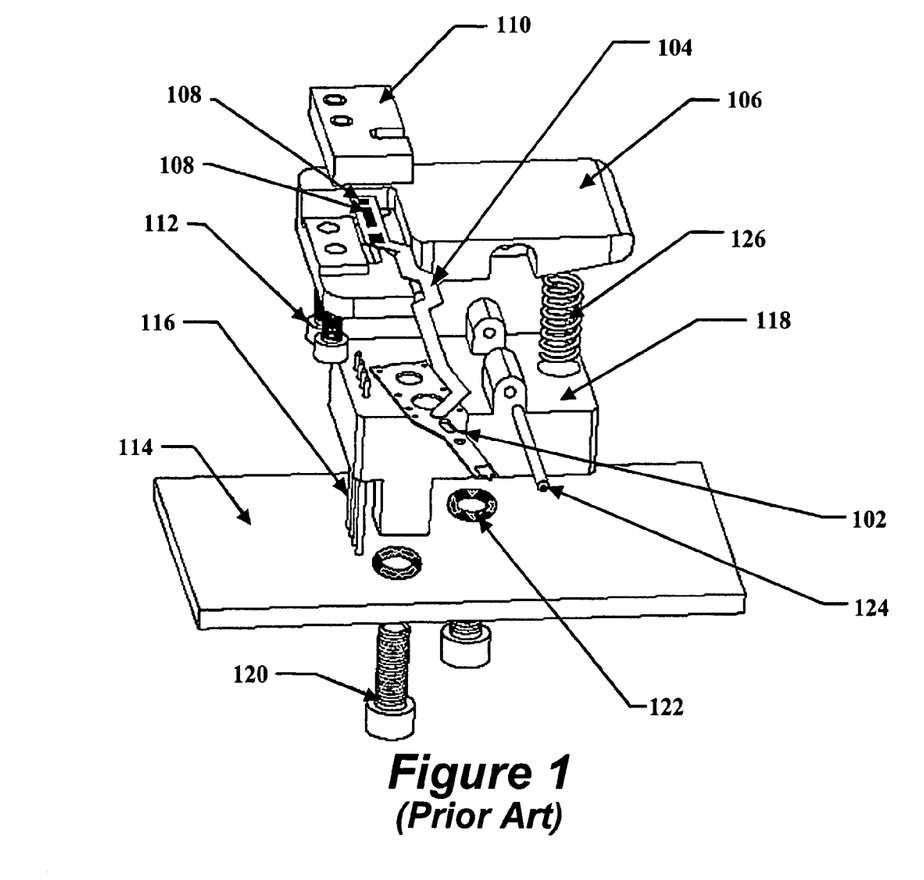
FIG. 1 illustrates in an exploded view a prior art clamping system for connecting test probes to the test pads of the flexible printed circuit of a head gimbal assembly.

FIG. 1 illustrates in an exploded view a prior art clamping system for connecting test probes to the test pads of the flexible printed circuit (FPC) of a head gimbal assembly (HGA). The HGA 102 with a FPC 104 is inserted into an indentation in a clamp 106. The FPC 104 has multiple test pads 108 accessible from both sides of the FPC, such as positive and negative read pads and positive and negative write pads. A cover 110 secures the FPC 104 in place on the clamp 106. In one embodiment, the cover is coupled to the clamp 106 by screws 112. The clamp is made of anti-static plastic having a surface resistivity between $10^{10}$ and $10^{12}$ ohms/square.

A preamplifier board 114 has one or more test probes 116 extending upward. A test probe housing 118 is coupled to the preamplifier board 114. In one embodiment, two plastic screws 120 are used to couple the test probe housing 118 to the preamplifier board 114. A grounding pad 122 can be placed around each of the screws to prevent discharge. The test probes 116 extend up through the test probe housing 118 and correspond to each of the bottom test pads on the FPC 104.

Figure 2A:
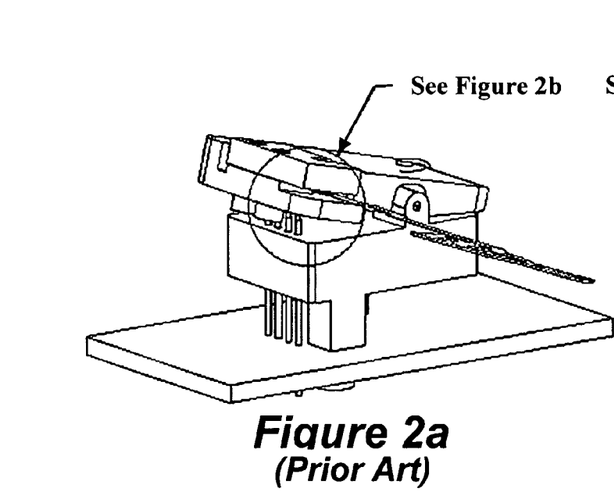
FIGS. 2a–d illustrates a diagram showing the prior art clamp system in use.
Figure 2B:
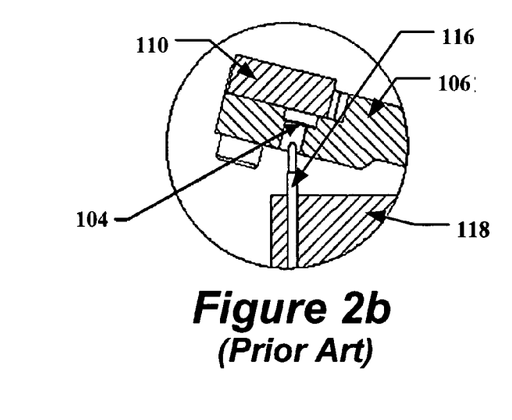

The test probe housing 118 is coupled to the clamp 106 by a rotary pin 124. FIG. 2a illustrates a diagram showing the clamp system in an open position, such as when the FPC is inserted into the clamp. FIG. 2b shows a close up cross-section of the clamping system in the open position. At this point, the test pads 108 of the FPC 104 are not in contact with the test probes 116.

Figure 2C:
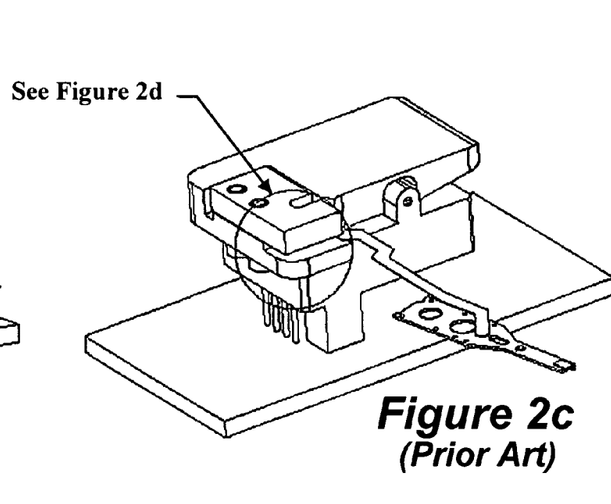
Figure 2D:
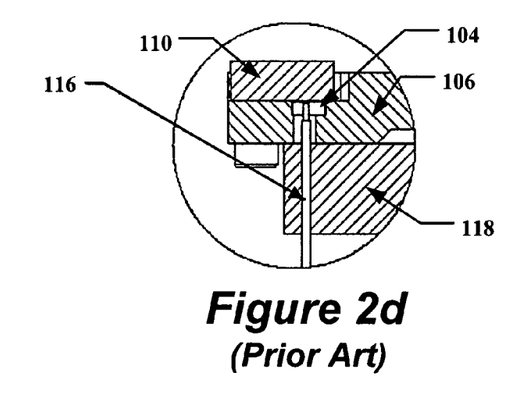

A compression spring 126 forces the clamp 106 to rotate into contact with the test probe housing 118. FIG. 2c illustrates a diagram showing the clamp system in a closed position. FIG. 2d shows a close up cross-section of the clamping system in the closed position. At this point, the test pads 108 of the FPC 104 are forced into contact with the test probes 116.

The problem with this method is that the test probes 116 are brought into contact with the test pads 108 before the electrical potential difference, or voltage, between the two can be equalized. This can create a massive transient current discharge, which can lead to electro-static damage to the magnetic read/write head of the head gimbal assembly.

DETAILED DESCRIPTION

A system and method are disclosed for clamping test probes to the test pads of a flexible printed circuit (FPC) of a head gimbal assembly (HGA). In one embodiment, a two-step contact method is used to prevent electro-static damage. The clamp is made of a dissipative material, as is the test probe housing. A spring-loaded slider block in the test probe housing allows the clamp to make contact with the test pads before the test pads are brought into contact with the test probes. The dissipative material of the clamp and the housing allows the electrical potential of the test pads and the electrical potential of the test probes to be equalized before the two are brought into contact with each other.

Figure 3:
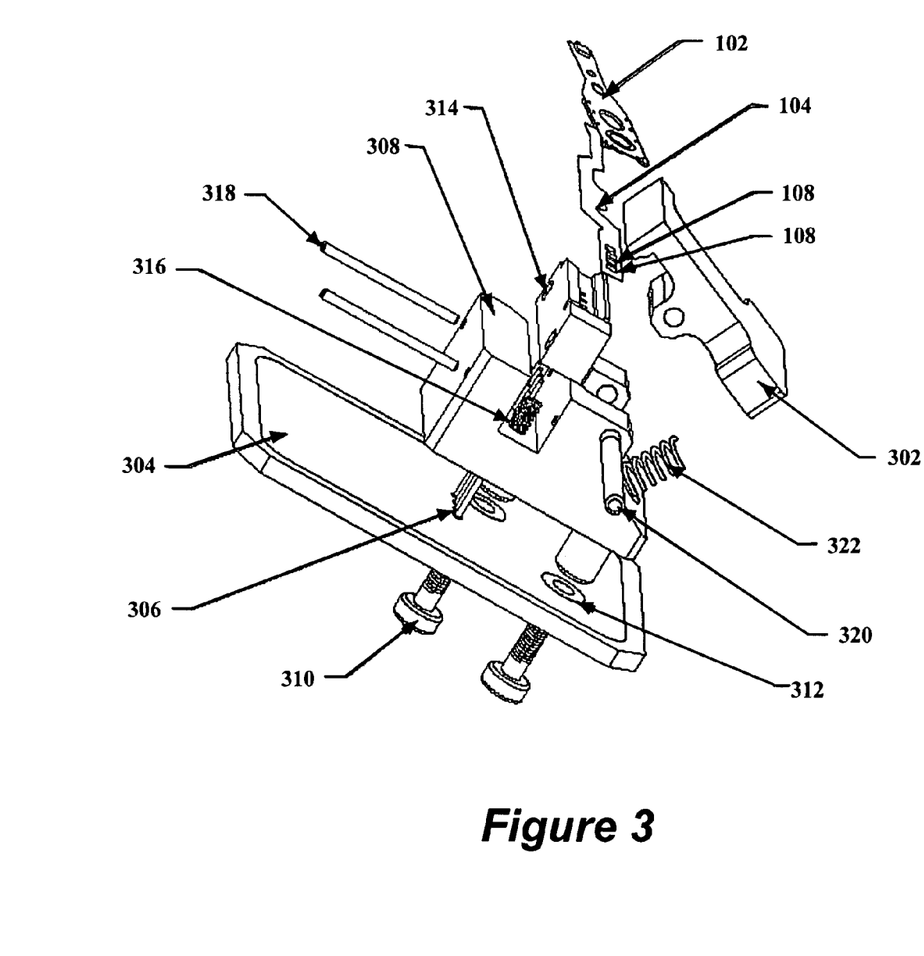
FIG. 3 illustrates in an exploded view one embodiment of a "two step contact" clamping system for connecting test probes to the test pads of the flexible printed circuit of a head gimbal assembly.

FIG. 3 illustrates in an exploded view one embodiment of a clamping system for connecting test probes to the test pads of the FPC of a HGA. The HGA 102 with a FPC 104 is placed underneath a clamp 302, so that the clamp comes into contact with the tops of the one or more test pads 108, such as positive and negative read pads and positive and negative write pads of the FPC 104. The clamp is made of a dissipative material, such as a dissipative plastic (e.g. Semitron 420® produced by DSM Engineering Plastic Products, Inc.®). In one embodiment, the dissipative material has a surface resistivity between $10^6$ and $10^8$ ohms/square.

A preamplifier board 304 has one or more test probes 306 extending upward. A test probe housing 308 is coupled to the preamplifier board 304. In one embodiment, two plastic screws 310 are used to couple the test probe housing 308 to the preamplifier board 304. A grounding pad 312 can be placed around each of the screws to prevent discharge. The test probes 306 extend up through the test probe housing 308 and correspond to each of the bottom test pads on the FPC 104. A slide block 314 fits within a cavity within the test probe housing 308. The slide block 314 has an indentation for the FPC 104 to be placed in. The slide block 314 slides vertically within the test probe housing 308. A first compression spring 316 applies upward pressure upon the slide block 314. A pair of stopper guide pins 318 limits the range over which the slider block 314 can slide. The test probe housing 308 is coupled to the clamp 302 by a rotary pin 320. A second compression spring 322 forces the clamp 302 to rotate into contact with the test probe housing 308. In one embodiment, the entire system is placed on a grounding fixture (not shown). The grounding fixture can be made of metal. While in the present embodiment the clamp performs a rotational movement and the slider block performs a linear movement, other embodiments have the clamp performing a linear movement or the slider block performing a rotational movement.

Figure 4A:
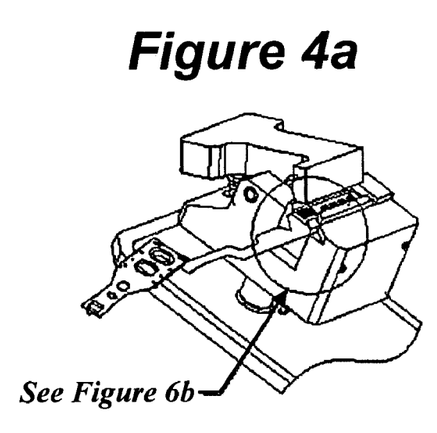
FIGS. 4a–f illustrates a diagram showing the "two-step contact" clamp system in use.
Figure 4B:
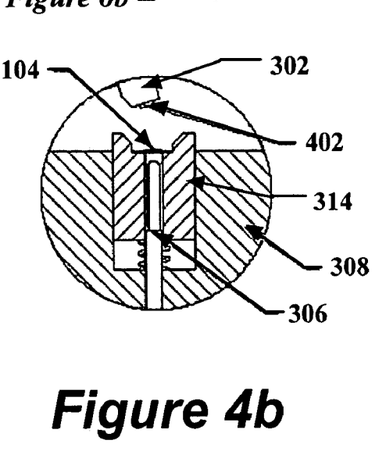

FIGS. 4a–f show one embodiment of the two-step contact clamping system. FIG. 4a illustrates the clamp system in the open position. FIG. 4b shows a close up cross-section of the two-step contact clamping system in the open position. At this point, the test pads 108 of the FPC 104 are not in contact with the test probes 306. The slide block 314 is in the fully extended position. Additionally, the protrusion 402 on the end of the clamp 302 is not yet in contact with the test pads 108.

Figure 4C:
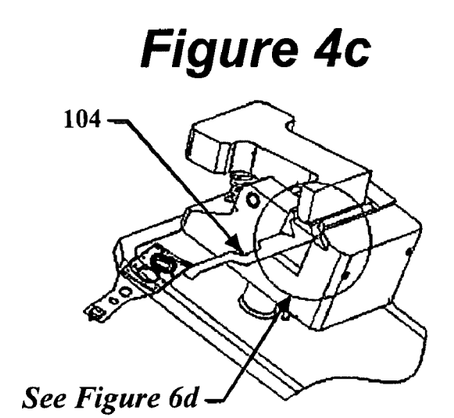
Figure 4D:
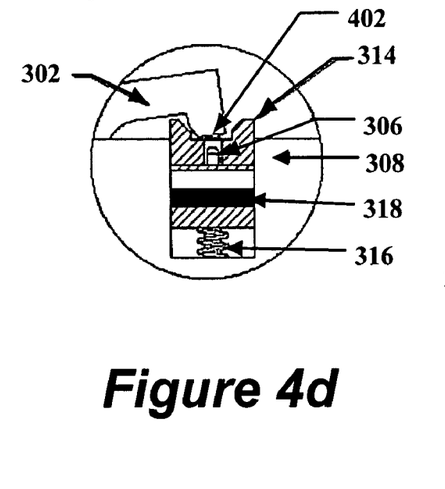

FIG. 4c illustrates the clamp system in the first position. FIG. 4d shows a close up cross-section of the two-step contact clamping system in the first step position. At this point, the test pads 108 of the FPC 104 are still not in contact with the test probes 306. The slide block 314 is in the fully extended position. The protrusion 402 on the end of the clamp 302 is now in contact with the test pads 108. This allows the electrical potential of the test pads 108 and the electrical potential of the test probes 306 to be equalized via the clamp and the test probe housing. The nature of the dissipative material keeps the change in electrical potential from being too jarring. The possible static electrical potentials will be discharged by the clamp 302, through the pin 318, the test probe housing 308, the grounding pad 312, the preamplifier board 304, and the grounding fixture.

Figure 4E:
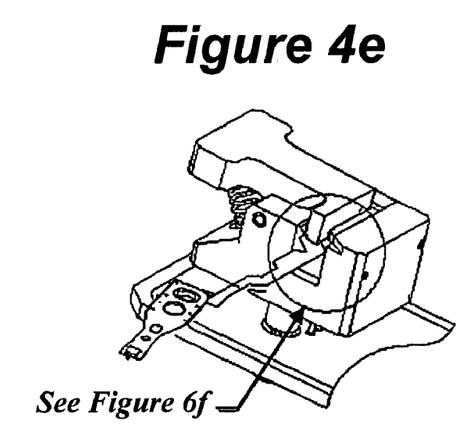
Figure 4F:
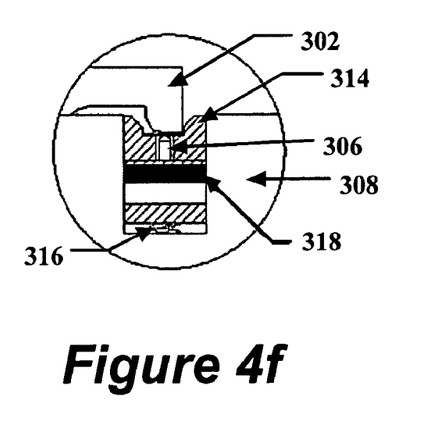

FIG. 4e illustrates the clamp system in the second position. FIG. 4f shows a close up cross-section of the two-step contact clamping system in the first step position. At this point, the slide block 314 has moved into a retracted position and the second spring 316 is compressed. The test pads 108 of the FPC 104 are now in contact with the test probes 306.

Figure 5:
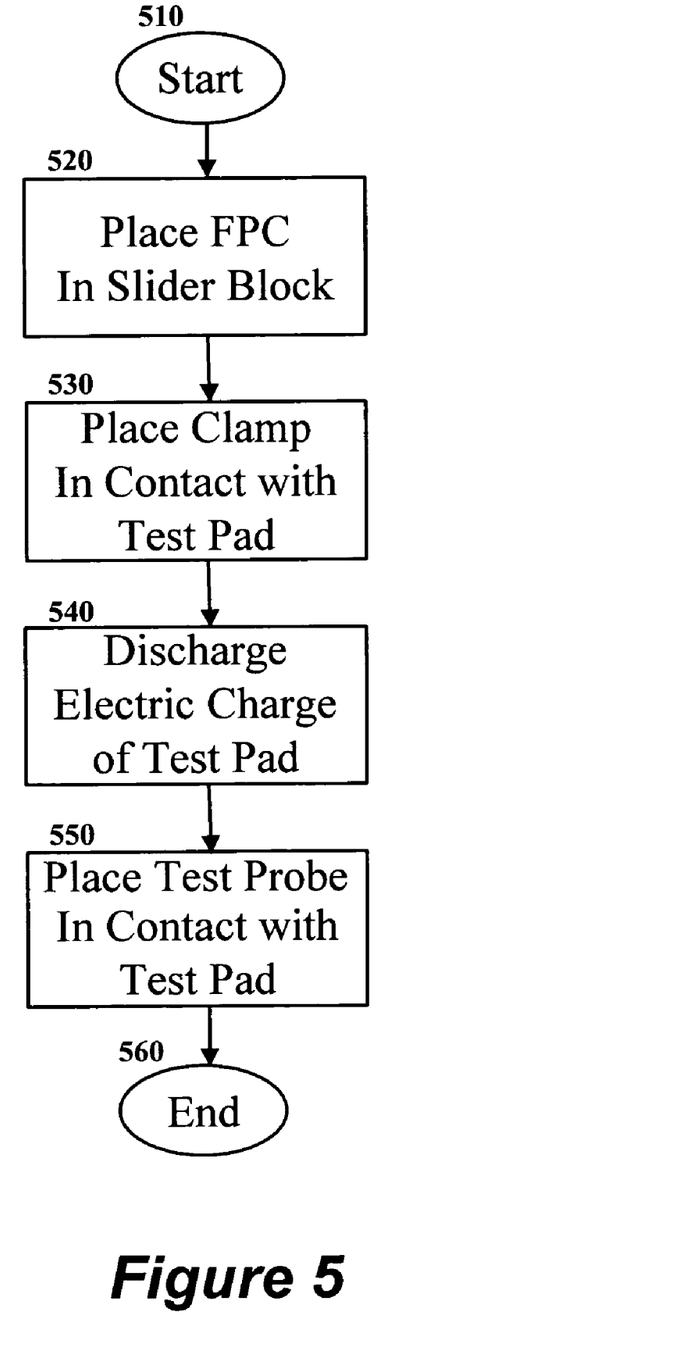
FIG. 5 illustrates, in a flowchart, one embodiment of the two-step contact process.

FIG. 5 illustrates, in a flowchart, one embodiment of the two-step contact process. The process starts (Block 510) with placing the FPC 104 of the HGA 102 into the slider block 314 (Block 520). The clamp 302 is placed in contact with the test pad 108 of the HGA 102 (Block 530). The electric charge of the test pad is discharged (Block 540). The test probe is placed in contact with the test pad (Block 550), ending the process (Block 560).

Figure 6A:
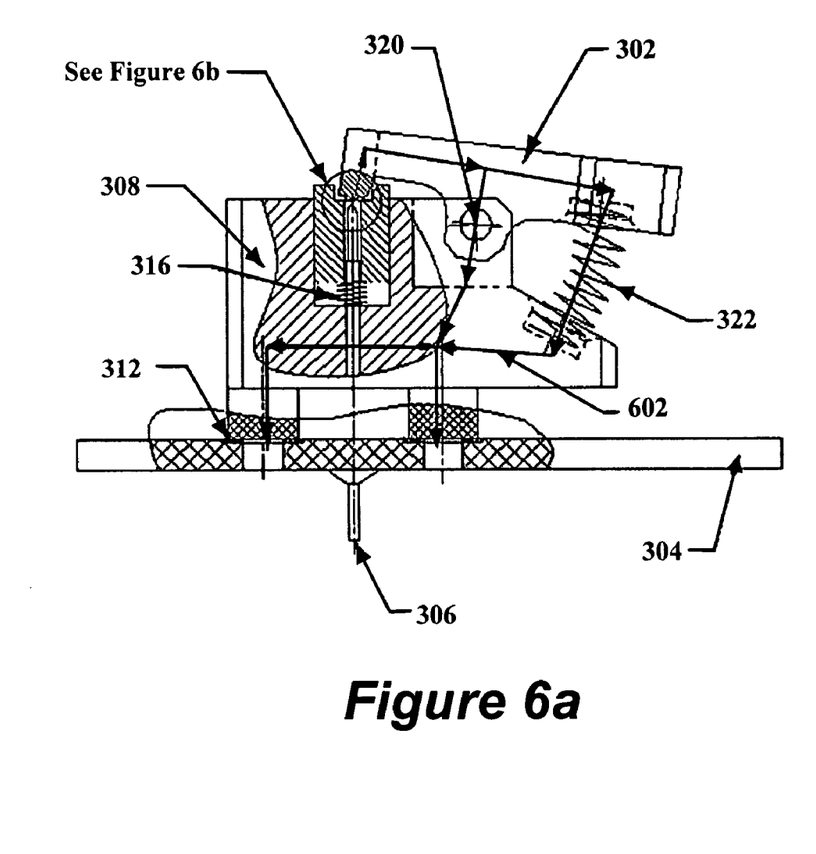
FIGS. 6a–b illustrate in a diagram one embodiment of the two-step contact fixture static electric potential discharge route.
Figure 6B:
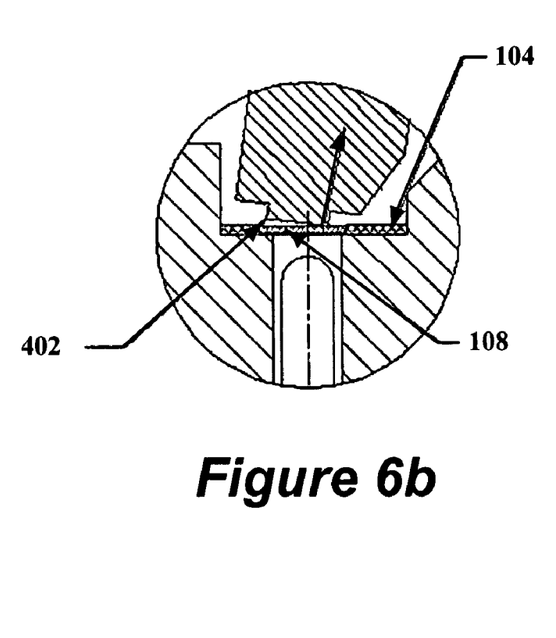

FIG. 6a in a diagram and FIG. 6b in a close up diagram illustrate one embodiment of a static electric potential discharge route. The protrusion 402 of clamp 302 touch the test pad 108 of the FPC 104. The test probe 306 then touches the test pad 108 1–5 seconds later. This time delay between the contact between the clamp 302 and test pad 108 and the contact between the test probe 306 and the test pad 108 allows the electrical charge on the test pad 108 to equalize by discharging. The electric charge on the test pad 108 is discharged through the clamp 302, the spring 322, the housing 308 along the discharge route 602, to the grounding pad 312.

Figure 7:
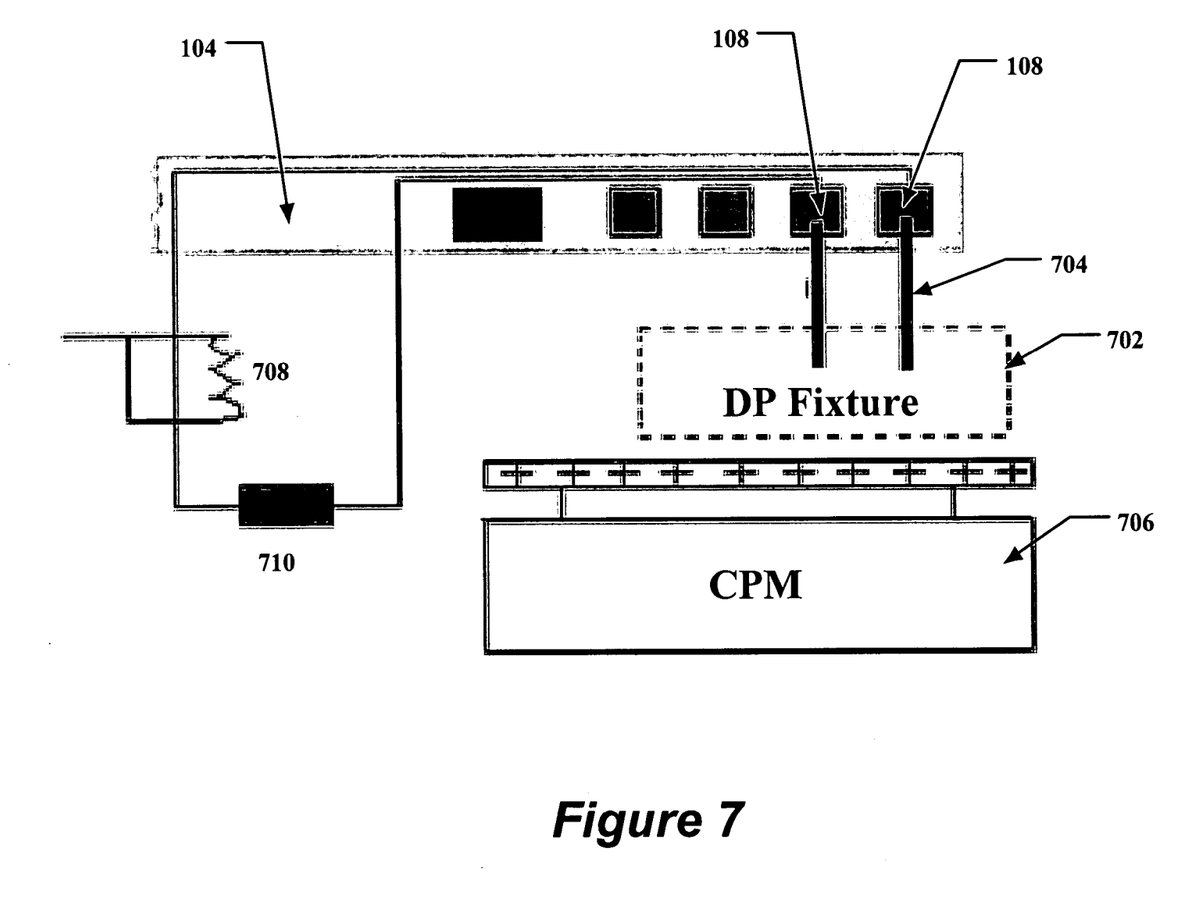
FIG. 7 illustrates in a diagram one embodiment of a simulation apparatus of HGA damage comparison testing.
Figure 8A:
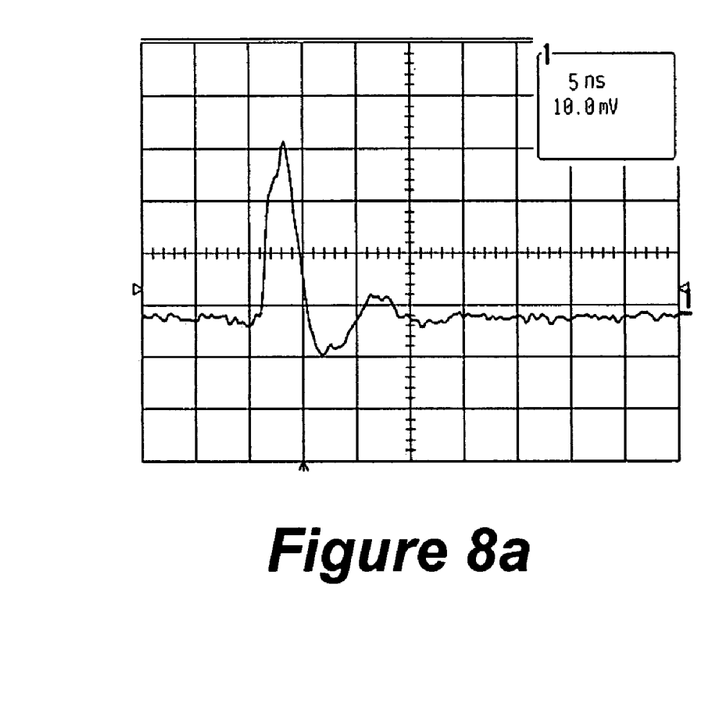
FIGS. 8a–b illustrates the resulting waveforms produced by the evaluation of FIG. 7.
Figure 8B:
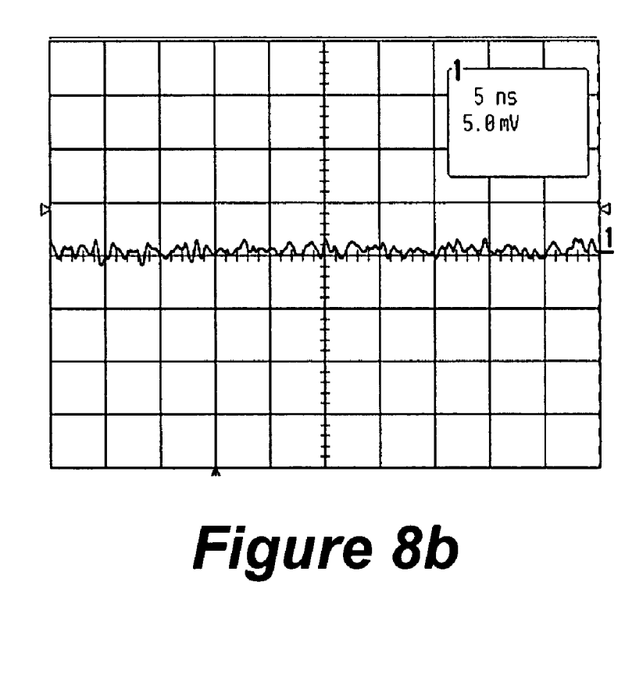

FIG. 7 illustrates in a diagram one embodiment of an evaluation apparatus for the two-step contact clamping system. A circuit 104 has two of its test pads 108 coupled to first a prior art dynamic performance (DP) fixture 702 and then a "two-step contact" DP fixture 702. A pair of pogo pins 704 couples the test pads 108 to the DP fixtures 702. A charge plate monitor (CPM) 706 is used to provide an electric field to simulate different voltages between the HGA 102 and the DP fixture 702 and induce the charge. A current probe 708 with a 50-ohm resistor 710 is used to measure the transient current caused by contact between the pogo pins and the HGA positive read pads and the negative read pads. The 50-ohm resistor simulates the head gimbal assembly magnetic read/write head resistance. The resulting waveforms produced by this evaluation are illustrated in FIGS. 8a–b. FIG. 8a shows the waveform of the prior art DP fixture. A range of 5 ns and 10.0 mV is shown. When 200 volts are provided by the CPM, a transient current of 6.94 mA results. FIG. 8b shows the waveform of the "two-step contact" DP fixture. A range of 5 ns and 5.0 mV is shown. When 200 volts are provided by the CPM, no transient current results.

The invention claimed is:

1. A clamping fixture, comprising:
    a first test probe to interface with a test pad of a flexible printed circuit of a head gimbal assembly;
    a test probe housing made of dissipative material to hold the first test probe;
    a clamp made of the dissipative material coupled to the test probe housing to press against the test pad; and
    a slide block within the test probe housing to prevent contact between the first test probe and the test pad until the clamp and test probe housing equalizes direct potential between the first test probe and the test pad.

2. The clamping fixture of claim 1, wherein the dissipative material of the clamp has a surface resistivity between $10^6$ and $10^8$ ohms/square.

3. The clamping fixture of claim 1, wherein the clamp moves in a rotary motion.

4. The clamping fixture of claim 1, wherein the clamp moves in a linear motion.

5. The clamping fixture of claim 1, wherein the slide block moves in a rotary motion.

6. The clamping fixture of claim 1, wherein the slide block moves in a linear motion.

7. The clamping fixture of claim 1, further comprising multiple test probes.

8. A clamping system, comprising:
    a first test probe to interface with a test pad of a flexible printed circuit of a head gimbal assembly;
    a test probe housing made of dissipative material to hold the first test probe;
    a preamplifier board electrically coupled to the first probe;
    a grounding pad to ground the test probe housing;
    a fixture to support the preamplifier board;
    a clamp made of the dissipative material coupled to the test probe housing to press against the test pad; and
    a slide block within the test probe housing to prevent contact between the first test probe and the test pad until the clamp equalizes electrical potential between the first test probe and the test pad.

9. The clamping system of claim 8, wherein the dissipative material of the clamp has a surface resistivity between $10^6$ and $10^8$ ohms/square.

10. The clamping system of claim 8, wherein the clamp moves in a rotary motion and the slide block moves in a rotary motion.

11. The clamping system of claim 8, wherein the clamp moves in a linear motion and the slide block moves in a linear motion.

12. The clamping system of claim 8, further comprising multiple test probes.

13. The clamping system of claim 8, wherein the fixture is metal to ground the preamplifier board.

14. A method, including:
    pressing a clamp of dissipative material against a test pad of a flexible printed circuit of a head gimbal assembly;
    preventing contact between a first test probe and the test pad with a slide block equalizing electrical potential between the first test probe and the test pad via the clamp; and
    lowering the slide block to allow contact between the first test probe and the test pad.

15. The method of claim 14, wherein the dissipative material of the clamp has a surface resistivity between $10^6$ and $10^8$ ohms/square.

16. The method of claim 14, further comprising moving the clamp in a rotary motion.

17. The method of claim 14, further comprising moving the clamp in a linear motion.

18. The method of claim 14, further comprising moving the slide block in a rotary motion.

19. The method of claim 14, further comprising moving the slide block in a linear motion.

20. The method of claim 14, wherein multiple test probes contact multiple test pads.

* * * * *

UNITED STATES PATENT AND TRADEMARK OFFICE
CERTIFICATE OF CORRECTION

PATENT NO. : 7,084,654 B2  Page 1 of 1
APPLICATION NO. : 11/051039
DATED : August 1, 2006
INVENTOR(S) : Yangguo Zhao et al.

It is certified that error appears in the above-identified patent and that said Letters Patent is hereby corrected as shown below:

On the title page, item [56]: under: Foreign Application Priority Data

"PCT/CN04/00773" should be --PCT/CN2004/000773--

Column 2, line 34: "Semitron 420®" should be --Semitron® ESd 420--

Column 2, Line 35: "DSM Engineering Plastic Products, Inc.® should be --DSM Engineering Plastic Products, Inc.--

Signed and Sealed this

Fifth Day of January, 2010

David J. Kappos
*Director of the United States Patent and Trademark Office*